(12) United States Patent
Chaffee

(10) Patent No.: X8207
(45) Date of Patent: May 17, 1834

(54) BOOTS & SHOES, FROM INDIA RUBBER LEATHER

(76) Inventor: Edwin M. Chaffee

Edwin M Chaffee of Roxbury Mafsachusetts

Letters Patent.

The Schedule referred to in these Letters Patent and making part of the same containing a description in the words of the said Edwin M Chaffee himself of his improvement in the mode of making Water Proof Boots & shoes from India Rubber Leather or India Rubber cloth &c To all whom it may concern Be it known that I Edwin M Chaffee of Roxbury in the County of Norfolk and Commonwealth of Mafsachusetts. have invented a new and useful improvement in the mode of making Water Proof Boots & shoes from India Rubber Leather or India Rubber cloth by cementing them together at the seams thereby dispensing with sewing altogether. and that the following is a full and exact description of my said improvement. In the first place I take the India Rubber Leather or India Rubber cloth. and cut out the pattern of the Boot or Shoe in the usual form. and also the lining which must likewise be of India Rubber Leather or India Rubber cloth. so that when the outside and the lining are put together, the india Rubber surface of both outside and lining will come together and adhere by being wet with a solution of India Rubber in spirits of turpentine and prefsed together with the hands. the seams which close the quarters and the vamp together are made in the following manner. The lining of the quarter is cut about one quarter of an inch longer than the outside. and the lining of the vamp is cut as much shorter. so that the lining of the quarter overlaps the joint or seam of the outside. and the joint or seam of the lining is overlapped by the outside of the vamp in addition to this a piece of cloth or leather three fourths of an inch wide and as long as the seam which I call a stay is cemented between the outside and the lining and breaks the joint or seams in both. The quarters are closed together in the same manner when they are cut in two pieces. and a stiffner is cemented in between the lining and the outside in both cases. The inner sole is then fitted to the last in the usual manner. and is then coated with the solution or cement.

The uppers are then put on the last and the inside of the lining is then coated with the cement all round the bottom edge and as wide as it is to come in contact with the inner sole when drawn over it. to which it is secured by merely pressing it with the hand. The bottom is again coated with the cement as far as it is required to have the outer sole adhere. and the outer sole is then coated on the inside and put on and pressed with the hands till it adhere firmly. The heel is also cemented on in the same manner. but if a spring heel be wanted it must be put on before the outer sole. After the shoe is dry it is then trimmed off and Bound in the usual manner.

What I claim as my invention is the construction of Water proof or other Boots & shoes upon the principles above described.

In testimony that the foregoing is a true specification of my said invention. I hereunto set my hand this nineteenth day of March in the year one thousand Eight Hundred and thirty four

[illegible] Witnesses
[illegible] Thomas A Yeater
Geo M Yeater

Edwin M Chaffee

No drawing necessary